United States Patent [19]

Gordon et al.

[11] 4,396,485

[45] Aug. 2, 1983

[54] FILM PHOTOELECTRODES

[75] Inventors: Arnold Z. Gordon, Lyndhurst; Kenneth L. Hardee, Middlefield, both of Ohio

[73] Assignee: Diamond Shamrock Corporation, Dallas, Tex.

[21] Appl. No.: 259,944

[22] Filed: May 4, 1981

[51] Int. Cl.$^3$ .................. C25B 11/04; H01M 6/36
[52] U.S. Cl. .................. 204/290 R; 204/290 F; 429/111; 427/126.1; 427/126.6
[58] Field of Search ............... 429/111; 204/290 R, 204/290 F

[56] References Cited

U.S. PATENT DOCUMENTS

| | | | |
|---|---|---|---|
| 3,801,490 | 4/1974 | Welch | 204/290 F |
| 3,804,740 | 4/1974 | Welch | 204/290 R |
| 3,853,739 | 12/1974 | Kolb et al. | 204/290 F |
| 3,992,280 | 11/1976 | Zöllner nee Möller et al. | 204/290 F |
| 4,003,817 | 1/1977 | Bianchi et al. | 204/290 F |
| 4,011,149 | 3/1977 | Nozik | 204/129 |
| 4,012,296 | 3/1977 | Stephens et al. | 204/98 |
| 4,040,918 | 8/1977 | Johnson et al. | 204/98 |
| 4,061,549 | 12/1977 | Hazelrigg, Jr. et al. | 204/98 |
| 4,061,558 | 12/1977 | Saito et al. | 204/290 F |
| 4,065,377 | 12/1977 | Zollner et al. | 204/290 F |
| 4,076,611 | 2/1978 | Gray | 204/290 F |
| 4,090,933 | 5/1978 | Nozik | 204/129 |
| 4,115,631 | 9/1978 | Deb | 429/111 |
| 4,118,547 | 10/1978 | Witzke et al. | 429/111 |
| 4,127,499 | 11/1978 | Heller et al. | 204/2.1 |
| 4,144,147 | 3/1979 | Jarrett et al. | 204/129 |
| 4,144,147 | 3/1979 | Jarrett et al. | 204/129 |
| 4,149,173 | 4/1979 | Schmelz et al. | 357/10 |
| 4,167,461 | 9/1979 | Dickson et al. | 204/102 |
| 4,172,925 | 10/1979 | Chen et al. | 429/111 |
| 4,181,593 | 1/1980 | McKinzie et al. | 204/290 F |
| 4,181,754 | 1/1980 | McKinzie et al. | 427/74 |
| 4,187,155 | 2/1980 | de Nora et al. | 204/67 |
| 4,188,464 | 2/1980 | Adams et al. | 429/210 |
| 4,204,933 | 5/1980 | Barlow et al. | 204/181 N |

FOREIGN PATENT DOCUMENTS 2644737 4/1978 Fed. Rep. of Germany .
2312123 12/1977 France .
2410506 6/1979 France .

OTHER PUBLICATIONS

M. A. Butler et al., "Photoelectrolysis with YFeO$_3$ Electrodes", *J. Appl. Phys.*, vol. 48, pp. 3070–3072 (1977).

P. Salvador, "The Influence of Niobium Doping On the Efficiency of n–TiO$_2$ Electrode in Water Photoelectrolyis", *Solar Energy Mat'ls.*, vol. 2, pp. 413–421, (1980).

C. Stalder et al., "Photoassisted Oxidation of Water at Beryllium–Doped Polycrystalline TiO$_2$ Electrodes", *J. Electrochem. Soc.*, vol. 126, pp. 2007–2011, (1979).

M. Tomkiewicz et al., "Photoelectrolysis of Water with Semiconductors", *Appl. Phys.*, vol. 18, p. 21, (1979).

A. B. Ellis et al., "Semiconducting Potassium Tantalate Electrodes", *J. Phys. Chem.*, vol. 80, pp. 1325–1328, (1976).

"Photo-Oxidation of Water at Barium Titanate Electrodes," Kennedy and Frise, Jr., J. Electrochem, Soc., 123,1683 (1976).

"Transition–Metal Dopants For Extending the Response of Titanate Photoelectrolysis Anodes," Maruska and Ghosh, Solar Energy Materials 1, pp. 237–247 (1979).

"Preparation and Czochralsk Crystal Growth of the Iron Titanates, FeTiO$_3$, Fe$_2$TiO$_4$ and Fe$_2$TiO$_5$," Binely and Baughman, *Mat. Res. Bull.*, vol. 11, pp. 1539–1544 (1976).

"The Photoelectrolysis of Water Using Iron Titanate Electrodes," (Ginley and Butler) *J. Appl. Phys.*, 48,2019 (1977).

"Semiconductor Electrodes II, Electrochemistry at N–type TiO$_2$ Electrodes in Acetonitrile Solutions", Frank, *J. Am. Chem. Soc.* 97:7427 (1975).

"The Chemical Vapor Deposition and Application of Polycrystalline in N-type Titanium Dioxide Electrodes to the Photosensitized Electrolysis of Water", Hardee, *J. Electrochem. Soc.* 122:739 (1975).

*Primary Examiner*—Aaron Weisstuch
*Attorney, Agent, or Firm*—Bruce E. Harang

[57] ABSTRACT

Photoactive n-type and p-type semiconductor film electrodes utilizable in photoassisted reactions in photoelectrochemical cells and/or photovoltaic cells comprising a true solid/solid solution of a specific composition of non-oxide metal compounds which when fired produce a photoactive true solid/solid solution of mixed metal oxides providing an effective band gap and/or optical response optimally matched to the part of the energy spectrum desired for a particular utilization. The photoactive semiconductor film electrodes have a film layer of true solid/solid solution mixed metal oxide disposed upon a suitable substrate in either one or more coats.

25 Claims, 2 Drawing Figures

FILM PHOTOELECTRODES

BACKGROUND OF THE INVENTION

This invention relates generally to photoactive semiconductor film electrodes suitable for use in electrochemical cells and in "photoassisted" electrochemical reactions utilizing true solid/solid solutions of diverse mixed metal oxides.

There has been considerable recent interest in the application of the photoactive semiconductor film electrodes to the electrolysis of water and to the direct conversion of solar energy to electrical, fuels, chemicals and/or chemical energy. The uses of such electrodes have been generalized as reduction-oxidation reactions in addition to the electrolysis of water. Oxidation reactions at n-type photoactive semiconductor electrodes and reduction reactions at p-type photoactive semiconductor electrodes can be carried out at potentials lower than ordinarily required utilizing light as an additional driving force for these reactions. Such processes have been termed "photoassisted" rather than photocatalyzed reactions. There are, however, two major obstacles which must be overcome in order to make direct conversion of solar energy to electrical, fuels, chemicals and/or chemical energy and/or the electrolysis of water a viable commercial process both on the industrial level and on the consumer level. The first of these two problems is reducing the cost of producing the desired end result, i.e., electrolysis of water or direct conversion of solar energy to electrical, fuels, chemicals and/or chemical energy. The second problem is producing a system that has a long life in actual use. An acceptable life span is generally thought to be twenty years. Oxides of aluminum, niobium, tantalum, titanium and tin, for example, answer both of the above problems and do exhibit photochemical response. It has been long known, for example, that titanium dioxide ($TiO_2$) fills both of the requirements of long life and economical production of n-type and p-type electrodes for use in the electrolysis of water or the direct conversion of solar energy to chemical or electrical energy. However, titanium dioxide by itself has an unacceptably large "band gap" in relation to the solar spectrum. The term "band gap" as herein and hereafter used means the amount of energy (measured, for example, as eV) needed to raise an electron in a valence band to the lowest available energy level conduction band. This band gap is too wide for use with 97 percent of the available solar energy spectrum for pure $TiO_2$, i.e., $TiO_2$ absorbs wavelengths that are shorter than 400 nanometers and 97 percent of the terrestrial solar spectrum has wavelengths that are longer than 400 nanometers. Titanium dioxide does have an additional advantage of being a material which is not toxic to the general environment. Thus it does not have any of the generally harmful effects, to the environment, commonly associated with materials having a band gap more closely attuned to the major energy output portion of the solar spectrum such as, for example, compounds formed from such elements as selenium, gallium, cadmium, tellerium and/or arsenic.

It is known that electrodes fabricated from, for example, single crystals of pure titanium dioxide, doped single crystals of titanium dioxide, or polycrystalline titanium dioxide, which may or may not be deposited on an appropriate substrate, can be used as photoelectrodes. Titanium dioxide has a band gap which is unacceptably high, i.e., about 3.0 eV. This band gap results in a maximum terrestrial power conversion efficiency of only about 1 or 2 percent. To form electrically conductive, semiconductor material, the titanium dioxide is typically treated by reduction with hydrogen or reduction in a vacuum. It is theorized that such treatment produces a material with oxygen lattice deficiencies in the titanium dioxide crystal, with these lattice defect sites contributing to the semiconductor properties. This partially reduced material can be characterized by the general formula $TiO_{(2-x)}$, where x takes on a value of between 0 and 1. Because of the great possibilities which these electrodes have for conversion of solar energy to electricity, fuels, chemicals and/or chemical energy, a number of studies have been directed to methods of fabricating electrodes which make such conversions more efficient. In previously described uses of n-type titanium dioxide semiconductor electrodes, it has generally been the practice to use electrodes formed from single crystals of $TiO_2$ or a polycrystalline $TiO_2$.

The technique of producing single crystal, photoactive $TiO_2$ electrodes is described, for example, by S. N. Frank et al. in "Semiconductor Electrodes 11: Electrochemistry at N-type $TiO_2$ Electrodes in Acetonitrile Solutions," *J. Am. Chem. Soc.* Vol. 97:7427 (1975). Polycrystalline titanium dioxide electrodes produced by chemical vapor deposition techniques are described, for example, by K. L. Hardee et al. in "The Chemical Vapor Deposition and Application of Polycrystalline in N-type Titanium Dioxide Electrodes to the Photosensitized Electrolysis of Water," *J. Electrochem. Soc.* Vol. 122:739 (1975).

Single crystal $TiO_2$ electrodes or doped single crystal $TiO_2$ electrodes are often costly and difficult to produce. On the other hand, polycrystalline electrodes which utilize $TiO_2$ as the photoactive semiconductor material are less difficult and less costly to produce, but are still limited in their spectral response to wavelengths of about 400 nanometers and shorter, corresponding to a band gap of approximately 3.0 eV or higher.

Another method of trying to alter the spectral response to $TiO_2$ electrodes involves making physical mixtures of titanium dioxide and other compounds with optical absorptions closer to the desired optimum of the solar spectrum, see for example U.S. Pat. No. 4,181,593. The above-identified U.S. Patent teaches physical mixtures of titanium dioxide and other transition metal oxides which have a chemical oxidation state other than (+4) which are sintered and placed on a titanium metal substrate. While this teaching does produce an electrode, it does not produce an electrode which has the necessary efficiency to make it economically feasible in the market place. Additionally, the above-identified U.S. Patent teaches an optical absorption adjustment of only 70 nanometers at best, i.e., up to about 470 nanometers. This is still far from the optimum wavelength of approximately 800 nanometers. Yet another method used to modify $TiO_2$ has been what is called "dying" of the $TiO_2$ either supported by another substrate or unsupported. These systems use a film layering over the $TiO_2$ of a material (frequently organic) which absorbs solar energy more efficiently than $TiO_2$ alone. These systems, however, are deficient in a number of areas. First, they do not provide the longevity necessary for an economical system in the market place. Secondly, they are not efficient. A method similar to the "dying" method is that of layering $TiO_2$ with a cover layer of one or more metal oxides which have a band gap more closely attuned to that of the solar spectrum. These systems, however, have all the limitations inherent in the "dying" type systems discussed above.

It is therefore an object of the present invention to provide a photoactive semiconductor film electrode comprising true solid/solid solutions of diverse metal oxides which are simple and inexpensive to produce; having a band gap and/or optical absorption optimized to the particular part of the energy spectrum of interest and which produce the necessary longevity. These and other advantages will become apparent in the following description of the instant invention.

SUMMARY OF THE INVENTION

It has now been found that photoactive semiconductor film electrodes can be readily and economically prepared having enhanced response to wavelengths of light longer than 400 nanometers, having satisfactorily long life, an extremely high resistance to attack and which do not necessitate elaborate post-production steps to realize these advantages.

One approach is to shift the mixed metal oxide film electrodes optical response to more closely attune it to the specific application while retaining the low cost of manufacture as well as the longevity and resistance to corrosion. For example, the ideal band gap for an electrode to be utilized for the conversion of terrestrial solar energy to chemical and/or electrical energy is a band gap of approximately 1.4 eV.

The present invention is directed broadly to photoactive semiconductor film electrodes wherein the photoactive semiconductor film comprises a photoactive semiconductor mixed metal oxide material containing metal components all of which are derived from precursor substances selected from the group consisting of elemental metals, non-oxide metal compounds, and mixtures thereof; said mixed metal oxide material corresponding to the formula $Ar^{va}M_y^{vm}O_2{}^{-2}$, where said formula represents the stoichiometry of the basic repeating unit lattice cell; where M is the combination of component (a) metal and component (b) metal; A, when present, is at least one different metal which does not substantially alter the optical absorption accruing from M in the above formula; O represents oxygen, said formula being further characterized in that r, y, z, va, and vm are defined by the relationship $va(r)+vm(y)=2z$ wherein r equals a value of from 0 to 2, inclusive, y is from 1 to 2, inclusive, z is from 1 to 7, inclusive, va equals the positive valence of A, vm equals the positive mean valence of M and the valence of oxygen is $-2$; and wherein all said metal components of said formula are selected from the group consisting of boron, aluminum, tin, lead, the transition metals of families 1b and 7b, inclusive, and 8 of the periodic table of elements and the lanthanide series; wherein M in the above formula comprises: (a) 50 to 99.9 mole percent, based on the total metals mole fraction, of one or more component (a) metals; and (b) 0.1 to 50 mole percent, based on the total metal mole fraction, of one or more component (b) metals; with the proviso that said component (b) metals are different than said component (a) metals and with the further proviso that said component (a) metals, when in comparable oxide form, have a larger band gap than said component (b) metals, when said component (b) metals are in their comparable oxide form. This true solid/solid solution provides an effective band gap and/or optical response optimally matched to the part of the energy spectrum desired for a particular utilization. The instant invention effectively shifts the resulting photoactive semiconductor mixed metal oxide materials optical absorption.

It has been found that this method of incorporating metal compounds as true solid/solid solution photoactive semiconductor mixed metal oxide material for use as the film on a substrate produces film electrodes suitable for use in photoelectrochemical cells and/or photovoltaic cells having high efficiency, long life and which are economically suitable for the market place. These electrodes avoid the cost and difficulties encountered in fabricating doped single crystal electrodes while functioning with good efficiency.

DETAILED DESCRIPTION

Figure 1:
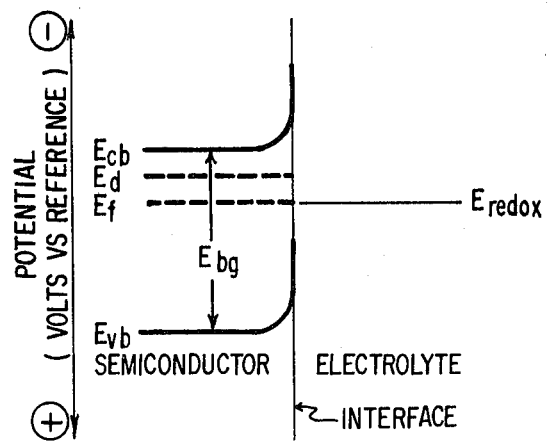
FIG. 1 is a schematic representation of the energy level relationship at the interface between a semiconductor electrode and an electrolyte.

True solid/solid solution photoactive semiconductor film electrodes according to the instant invention provide improved photochemical response and efficiency by combining at least two metal components, all of which are derived from precursor substances selected from the group consisting of elemental metals, non-oxide metal compounds, and mixtures thereof; for convenience, the metal component precursors, and thus also the metals themselves, are herein grouped together as components (a) and (b). Component (a) precursors may be defined as non-oxide precursor substances, which in their oxide form, each having a band gap larger in size than any component (b) precursor, when component (b) precursor is in comparable oxide form. The one or more component (b) precursors may then be defined as non-oxide precursor substances each of which in its comparable oxide form has a narrower band gap than any component (a) in comparable oxide form. Components (a) and (b) are combined to form a true solid/solid solution. Generally, component (a) and (b) precursors, being non-oxides, are elemental metals, non-oxide metal compounds or organometallic compounds as well as mixtures thereof, with the foregoing compounds containing, in addition to the metallic elements, other elements which are not exclusively oxygen. Suitable components (a) and (b) are those components containing metals selected from a grap consisting of boron, aluminum, tin, lead, the lanthanide series and the transition metals. (As used throughout the specification and claims, the term "transition metal" means any metallic element of families 1b, 2b, 3b, 4b, 5b, 6b, 7b, or 8 of the periodic table of elements; and lanthanide series means any one of the elements numbers 58 through 71, inclusive, as they appear on pages 448 and 449 of the *Handbook of Chemistry and Physics*, Chemical Rubber Publishing Company, Cleveland, Ohio (1963)).

The true solid/solid solution photoactive semiconductor mixed metal oxide electrode material is, in fact, a true solid/solid solution, i.e., it is a uniformly dispersed mixture, at the molecular or ionic level, of one or more substances (the solute) in one or more other substances (the solvent), analogous, for example, to the more commonly thought of solution types such as methanol in water (a liquid/liquid true solution). The metals of the components (a) and (b) precursors used to produce the true solid/solid solution photoactive semiconductor mixed metal oxide material of the instant invention are such that can result in the preparation of mixed metal oxide materials which can be represented by the general formula $A_r{}^{va}M_y{}^{vm}O_z$. In the formula, M is a combination of component (a) metal and component (b) metal and A when present is at least one different metal which does not effectively and/or substantially alter the optical absorption in the electromagnetic region of interest accruing from M, and O represents oxygen; further characterized in that r, y, z, va and vm are defined by the relationship $(va)(r)+(vm)(y)=2z$ wherein r is from 0-2, inclusive, y is from 1-2, inclusive, and z is from 1-7, inclusive, va equals the positive valence of A, vm equals the positive mean valence of M and the valence of oxygen is $-2$.

The A in the above general formula may be a single metal or A may be a combination of up to three different metals. In the formula, A may be any substantially optically passive metallic ion, such as zinc, strontium or lanthanide, wherein lanthanide represents any one of the elements Nos. 58 through 71, inclusive. The preferred metal or metals A are strontium, zinc or one or more of the lanthanides.

In the above general formula, M is a combination of two to four different metals, preferably two different metals. The combination of metals is derived, as described above, so as to have at least one larger band gap and at least one narrower band gap metal. As an example, titanium and ruthenium are suitable, since $TiO_2$ has a larger band gap than $RuO_2$, titanium is component (a) metal while ruthenium serves as the component (b) metal.

It is understood that in the above formula, the values of r, y and z may be described in fractional notation such as, for example, $SrTi_{0.67}Ru_{0.33}O_3$. This type of notation is used to represent the stoichiometry of the basic repeating unit lattice cell. This type of notation allows for the most simple illustrative cell structure to be used to describe the material in question (see, for example, FIG. 1). Further discussion of how this type of notation is used can be found in, for example, *Structure, properties and Preparation of Perovskite-Type Compounds*, Fransis S. Galasso, Pergamon Press, 1969. However, it is also understood that the formula $Sr_3Ti_2RuO_9$ is an equivalent expression of exactly the same compound. Thus, applicant realizes that using the more classical whole number formula format would result in values above those specified by applicant in his instant invention while in fact describing suitable compounds. Examples of suitable values of r, y and z and examples of the resulting formulae are, for example, $r=0$, $y=1$, $z=2$ and the final oxide compound corresponds to the formula $MO_2$; $r=1$, $y=1$, $z=3$ and the final oxide compound corresponds to the formula $AMO_3$; $r=2$, $y=2$, $z=7$ and the final oxide compound corresponds to the formula $A_2M_2O_7$; $r=0$, $y=2$, $z=3$ and the final oxide compound corresponds to the formula $M_2O_3$; $r=0$, $y=1$, $z=1$ and the final oxide compound corresponds to the formula MO. Other compounds having other final oxide forms are also possible. Some specific examples are, for example, (Pd,Ca)O representing the form MO; $(Ti,V)O_2$ representing the form $MO_2$; $(Fe,Al)_2O_3$ representing the form $M_2O_3$; $K(Ta,Nb)O_3$ representing the form $AMO_3$ and $La_2(Ti,Ru)_2O_7$ representing the form $A_2M_2O_7$.

Component (a) precursor may be any elemental metal and/or other metal non-oxide compound which is soluble or can be made soluble, chosen from aluminum, boron, tin, lead, certain lanthanides or the transition elements which form true solid/solid solutions of the form $MO_2$, such as zirconium and niobium. Component (a) precursor may also be an elemental metal and/or other metal non-oxide compound which is soluble or can be made soluble, chosen from boron, aluminum, tin, lead, certain lanthanides or the transition metals which form true solid/solid solutions in the form $AMO_3$ such as, for example, titanium. Additionally, component (a) precursors may be an elemental metal and/or other metal non-oxide compound which is soluble or can be made soluble, chosen from aluminum, boron, tin, lead, certain lanthanides or the transition metals producing a material having the general formula $A_r{}^{va}M_y{}^{vm}O_z{}^{-2}$ (as defined above), wherein M is a mixture of a transition metal or tin or lead plus one or more other metals, chose from boron, aluminum, tin, lead, certain lanthanides or transition metals. By the term "certain lanthanides" used herein to refer to component (a) metals is meant those lanthanides which have a band gap (as defined above) which is larger than any component (b). Component (a) comprises 50 to 99.9 percent based on the total metals mole fraction of M. Preferred component (a) precursors are non-oxide compounds of aluminum, niobium, lanthanum, tantalum, tin, titanium and zirconium, most preferably titanium. Some specific examples are titanium ethoxide, diethyl tin dibromide, zirconyl iodide and lanthanum chloride.

Metals of component (b) may be any one or more of the transition metals in groups 1b through 7b and group 8 and/or of the lanthanide series elements 58 through 71, inclusive, and/or boron, aluminum, tin and lead as set out in the periodic table of elements, with the restriction that all component (b) metals must be different than component (a) metals. Component (b) comprises 0.1 to 50 percent based on the total metal mole fraction of M. Preferred component (b) precursors are those of the non-oxide metal compounds of iridium, manganese, chromium, iron, vanadium, platinum, rhodium and ruthenium, most preferably rhodium and ruthenium. Specific compounds suitable as component (b) precursors include, for example, ferrous sulfate, manganous acetate, ruthenium trichloride, rhodium nitrate and chloroplatinic acid.

Examples of preferred embodiments from which M may be derived are, for example, a non-oxide compound from the group niobium, lanthanum, tantalum, tin, titanium and zirconium, one or more of which is used together with at least one non-oxide metal compound of the group rhodium, ruthenium, iridium, manganese, chromium, iron, vanadium and platinum. Other combinations of non-oxide metal compounds selected from the group boron, aluminum, tin, lead, the lanthanide series and the transition metals are also suitable. Presently preferred compounds from which M may be derived are those consisting of two non-oxide metal compounds, one selected from the group niobium, lanthanum, tantalum, tin, titanium and zirconium and the other selected from the group rhodium and ruthenium. Specific examples of M are titanium-ruthenium, titanium-rhodium and zirconium-chromium.

The A in the above general formula may be any substantially, optically passive metal (as defined below) such as, for example, zinc, strontium or one of the lanthanide series metals. Photoactive semiconductor mixed metal oxide materials now produced may be used for both n-type and p-type photoactive semiconductor materials; alternatively, the p-type material when used in a n-p solar cell may be a material such as PdO, CoO, or one of the various $Ln_2O_3$ (lanthanide series oxide) phases and/or solid/solid solutions of said $Ln_2O_3$ materials.

By the term "soluble" as used herein is meant that component (a) and (b) precursors are generally easily dissolved in the solvent systems employed herein, described in greater detail below. By the term "can be made soluble," as such used herein, is meant generally that the component (a) and (b) precursors can be dissolved in the solvents useful in the instant invention (and described in greater detail below), but such dissolution must be accomplished by special techniques to guard against deleterious phenomena such as phase separation or precipitation. It is also understood that an A, in the above general formula, precursor, if used, must also be "soluble" or be capable of "being made soluble" as described above. Thus, for example, precursors such as $SrCO_3(A)$, $RhCl_3(b)$ and $Ti(C_2H_5O)_4(a)$ are suitable, and materials such as $TiB_2$ are not "soluble" nor can they "be made soluble" within the meaning of the above definitions.

Additionally, these photoactive semiconductor film electrodes may be further altered as to their electrical properties with dopants, procedures and treatments known and commonly used in the art. They include, for example, laser annealing, reduction and/or oxidation atmosphere annealing and doping.

Figure 2:
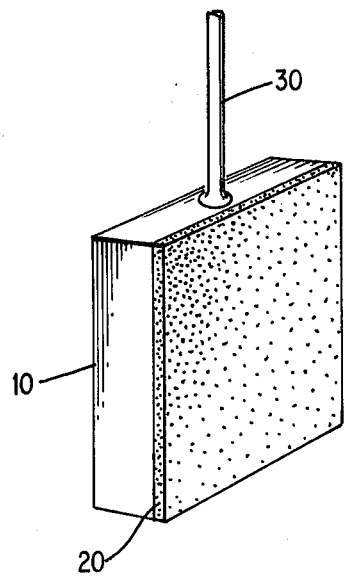
FIG. 2 is a perspective representation of a general type film electrode comprising a substrate 10, a film layer of photoactive semiconductor layer 20 and an electrical connector 30.

As shown in FIG. 2, an example of electrodes according to the instant invention comprise the suitable substrate "10" and the true solid/solid solution transition metal oxides "20". An electrical connector "30" permits connection of the electrode to an external electrical circuit. The connector can, for example, be a wire which is welded or conductive epoxy welded to the substrate body or, alternatively, for example, may form an integral part of the shaped substrate body itself.

In addition to the photoactive semiconductor mixed metal oxide material used as the film of a film electrode, a substrate is also necessary. The substrate may be, for example, a valve metal, a noble metal, a ceramic, a glass, other acceptable metals selected from the group consisting of the metals in groups 1a–5a, 1b–7b and 8 of the periodic table of elements or a composite or an alloy of two or more of the above.

Examples of valve metals are titanium, tantalum and aluminum. These metals, traditionally, are considered useful as cathodes but not as anodes because they quickly become passified by the formation of an oxide coating if used as an anode. Noble metals, used herein, are those metals gold, silver, platinum, palladium, iridium, rhodium, ruthenium and osmium. Examples of other metals which are suitable for use as a substrate are, for example, copper and steel. Suitable examples of composites are, for example, titanium metal plated nickel and gold plated steel.

Suitable ceramic and glass materials include, for example, alumina, "common" window glass, borosilicate glass and flint glass. It is to be understood these types of nonconductor materials must have some type of conductive surface layer such as, for example, a vapor deposited layer of titanium.

The photoactive semiconductor mixed metal oxide electrode materials can, for example, be sprayed either by flame or plasma spraying or dipped or painted onto said substrate. Other application techniques are also applicable, for example, electrochemical deposition, sputtering, evaporation deposition and chemical vapor deposition. Generally, the film thickness used is from 100 angstroms to 500 microns in thickness. The thickness of the final film electrode may be acquired either as a single one-coat film or by coating the substrate with a number of coats to build up the desired thickness. The use of multiple coating operations allows for several important advantages to be incorporated into said film electrodes. One such advantage is that each layer may be treated individually with some type of post-deposition treatment. The post-deposition treatments suitable for use with said film electrodes include, for example, heating in a vacuum in a controlled atmosphere such as, for example, nitrogen, argon, hydrogen or oxygen or a combination thereof, submitting the electrode film to elevated temperature such as, for example, 200° to 1800° C., ion implantation of dopants and/or laser annealing. Pretreatment of the electrodes is also possible and in some cases preferred. The pretreatments possible include, for example, those listed above as suitable post-deposition treatment.

Generally, the process of making the film electrodes encompassed herein is as follows: (1) a suitable substrate is coated with a film of true solid/solid solution photoactive semiconductor mixed metal oxide material powder having a particle size of from 0.1 to 200 microns and (2) the coated substrate is fired to produce said film electrode.

Alternatively, the suitable substrate may be coated with a film of the photoactive semiconductor non-oxide precursor solution before it is coated with the oxide powder form of the material and then fired (step (2) above) to simultaneously produce the oxide from the photoactive semiconductor powder material and the precursor film.

The term "firing" as used throughout the specification and claims means the controlled heating or annealing of the photoactive semiconductor material and/or said material and the substrate together. The controls include the temperature range (20° C. to 1600° C.), rate of temperature increase, length of time at temperature, and cool down rate. These parameters are those generally used in the art for a given, known method, such as, for example, laser treating or annealing.

As described and understood herein, a photoelectrochemical cell (PEC) in its most basic form consists of a semiconductor electrode (here a thin film electrode), an electrolyte and a counter electrode. Light energy impinging on the surface of the semiconductor electrode is the driving force for chemical reaction which takes place at the interface between the semiconductor electrode and the electrolyte. The interface between the electrolyte and the counter electrode is used to complete the electrical circuit.

The energy level relationships at the interface between a semiconductor electrode and an electrolyte solution in contact therewith are shown schematically in FIG. 1. Energy levels of the electrodes shown there, measured against a reference, are $E_f$, the Fermi level, and $E_{cb}$ and $E_{vb}$, the lowest lying energy level of the conduction band and the highest lying level of the valence band of the semiconductor, respectively. The energy band gap of the semiconductor is represented by $E_{bg}$.

Absorption of light by the semiconductor of an energy at least as large as $E_{bg}$ promotes an electron from the valence band to the conduction band and allows the subsequent separation of electron/electron hole pairs. In n-type titanium dioxide, the energy band gap is normally about 3.0 eV, corresponding to a light absorption edge of about 400 nanometers wavelength. In the photoactive true solid/solid solution semiconductor electrodes of the present invention, this absorption edge can be shifted as desired anywhere from the infrared region through the visible light spectrum and into the ultraviolet region, thus making these electrodes responsive to any area of the energy spectrum desired for a particular utilization. Currently, of course, the most important adaptation is one in which the band gap and/or optical absorption is modified to be approximately 1.4 eV, corresponding to a light absorption edge of about 800 nanometers, representing the region of greatest theoretical energy conversion efficiency of the terrestrial solar spectrum.

In an n-type system, for example, photogenerated electrons promoted to the conduction band migrate through the semiconductor while the corresponding electron holes tend to migrate to the electrode/electrolyte interface. If the reduction-oxidation potential, $E_{redox}$, of the electrolyte solution or of some solute species is more negative than $E_{vb}$, interfacial electron transfer can occur to fill the electron holes, simultaneously oxidizing the solvent or solute species. Oxidation of the semiconductor material itself may also occur if the potential for anionic dissolution, $E_d$, of the material is more negative than $E_{vb}$. Whether oxidation of some electrolyte species or the semiconductor material itself is the predominating reaction at the illuminated electrode may depend upon the relative surface rates of the two reactions.

If $E_d$ is more negative than $E_{redox}$, then the oxidized form of the electrolyte species, once formed by the photoassisted oxidation reaction, is capable of oxidizing the semiconductor material and the electrode surface may be corroded. The choice of modifying oxide is thus governed in part by the relative values of $E_d$ for the material and $E_{redox}$ for the oxidation reaction in which the modified type true solid/solid solution electrode is to be employed.

It has been found that the instant invention true solid/solid solution photoactive semiconductor mixed metal oxide thin film electrodes can be adjusted to absorb light anywhere along the electromagnetic spectrum from UV to infrared, where similar types of photoelectrodes of the prior art have been only minimally effective on the whole.

The following data is provided to allow one skilled in the art to make the photoactive semiconductor mixed metal oxide material for use as the film of the film electrode of the invention and should not be viewed as limiting the scope of the invention but merely illustrative thereof.

Photoactive semiconductor materials of the formula $SrTi_{1-x}Rh_xO_3$ were prepared as follows:

Strontium/Titanium Stock Solution: 147.6 g (1 mole) of $SrCO_3$ (reagent grade) was dissolved in approximately 600 mls of a solvent solution having a ratio (vol/vol) of 1 part concentrated aqueous HBr to 4 parts deionized water. When dissolution of the $SrCO_3$ was complete, 227.9 g (1 mole) of $Ti(C_2H_5O)_4$ (reagent grade) was added and mixed until complete dissolution, enough additional solvent solution was added to make 1 liter. A clear, yellow solution which keeps for 6 to 7 days at room temperature resulted. It is important to dissolve the $SrCO_3$ in most of the solvent solution first to help keep the $Ti(C_2H_5O)_4$ from precipitating the Ti out as $TiO_2$ immediately.

Strontium/Rhodium Stock Solution: 1.84 g (0.0125 mole) of $SrCO_3$ (puratronic grade) and 3.29 g (0.0125 mole) of $RhCl_3 \cdot 3H_2O$ (reagent grade) was dissolved and diluted to 1 liter volume in a solvent solution having a ratio (vol/vol) of 1 part concentrated aqueous HBr, 1 part isopropyl alcohol and 6 parts deionized water. The resulting solution was stored in a freezer at $-10°$ C. This solution seems to store indefinitely at this temperature. Inductively coupled plasma confirmed a Sr to Rh ratio of 1:1.

Five true solid/solid solution photoactive materials with differing amounts of Ti and Rh as shown in Table 1 were prepared by (a) intimately mixing the appropriate amounts of the Strontium-Rhodium and Strontium-Titanium solutions and (b) precipitating the metals by adding a solution containing 150 g of $NH_4HCO_3$, 80 ml of aqueous concentrated $NH_3$ and 100 ml of deionized water. The resulting precipitate containing solution was centrifuged in an International Equipment Co. Model EXD centrifuge at a setting of about 50 and the resulting supernatant removed by decanting. The precipitates were placed in alumina crucible with lids and were annealed in a Blue "M" box-type muffle furnace to approximately 600° to 800° C. at a rate of about 100° C./hour in an air atmosphere. The resulting solid/solid solution mixed metal oxides were allowed to cool and were stored in polypropylene bottles.

TABLE 1

| Sample No. | Stock Solution Sr—Ti (ml) | Stock Solution Sr—Rh (ml) | x (%)* |
|---|---|---|---|
| 1a | 60 | 240 | 4.8 |
| 1b | 200 | 180 | 1.1 |
| 1c | 200 | 120 | 0.74 |
| 1d | 200 | 90 | 0.56 |
| 1e | 200 | 45 | 0.28 |

*The value of x is a nominal value which, due to a number of possible loss mechanisms (i.e., metal staying in solution, precipitate too fine to bring down during centrifuging, vaporization, etc.), may be altered as to the actual final metal mole ratio.

While there has been shown and described what is believed at present to constitute the preferred embodiments of the present invention, it will be obvious to those skilled in the art that various changes and modifications may be made therein without departing from the scope of the invention as defined by the appended claims.

What is claimed is:

1. A photoactive film electrode comprising: a substrate; an electrical connector, and a film layer comprising a photoactive true solid/solid solution semiconductor mixed metal oxide material containing metal components all of which are derived from precursor substances selected from the group consisting of elemental metals, non-oxide metal compounds, and mixtures thereof; said mixed metal oxide material corresponding to the formula $A_r{}^{va}M_y{}^{vm}O_z{}^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in that r, y, z, va and vm are defined by the relationship $va(r) + vm(y) = 2z$, wherein r equals a value of from 0 to 2, inclusive, y is from 1 to 2, inclusive, z is from 1 to 7, inclusive, va equals the positive valence of A, vm equals the positive mean valence of M and the valence of oxygen is −2; and wherein all said metal components of said formula are selected from the group consisting of boron, aluminum, tin, lead, the transition metals of families 1b through 7b, inclusive, and 8 of the periodic table of elements and the lanthanide series;

wherein M in the above formula comprises:
(a) 50 to 99.9 mole percent, based on the total metals mole fraction, of one or more component (a) metals; and
(b) 0.1 to 50 mole percent, based on the total metals mole fraction, of one or more component (b) metals;

with the proviso that said component (b) metals are different than said component (a) metals and with the further proviso that said component (a) metals, when in comparable oxide form, have a larger band gap than said component (b) metals, when said component (b) metals are in their comparable oxide form; wherein said photoactive true solid/solid solution semiconductor mixed metal oxide material's optical absorption edge is thereby optimized to approximately 800 nanometers, corresponding to a band gap of about 1.4 eV.

2. A film electrode as claimed in claim 1 wherein said film of photoactive true solid/solid solution semiconductor mixed metal oxide material is deposited upon said substrate by dipping, painting, flame spraying or plasma spraying, electrochemical deposition, sputtering, evaporation and/or chemical vapor deposition.

3. A film electrode as claimed in claim 1 wherein said film layer of photoactive true solid/solid solution semiconductor mixed metal oxide material is deposited in a thickness of from about 100 angstroms to about 500 microns in thickness.

4. A film electrode as claimed in claim 1 wherein said electrode is subjected to treatments selected from the group consisting of predeposition treatments, post-deposition treatments and combinations thereof.

5. A film electrode as claimed in claim 1 wherein said substrate comprises a valve metal, a noble metal, other suitable metal, a ceramic, a glass or a composite thereof.

6. A film electrode as claimed in claim 1 wherein said film layer comprises photoactive true solid/solid solution semiconductor mixed metal oxide material of said formula where r is 0, y is 1, z is 2 and said material corresponds to the formula $MO_2$.

7. A film electrode as claimed in claim 1 wherein said film layer comprises photoactive true solid/solid solution semiconductor mixed metal oxide material of said formula where r is 1, y is 1, z is 3 and said material corresponds to the formula $AMO_3$.

8. A film electrode as claimed in claim 1 wherein said film layer comprises photoactive true solid/solid solution semiconductor mixed metal oxide material of said formulwa where r is 2, y is 2, z is 7 and said material corresponds to the formula $A_2M_2O_7$.

9. A film electrode as claimed in claim 1 wherein said film layer comprises photoactive true solid/solid solution semiconductor mixed metal oxide material of said formula where r is 0, y is 2, z is 3 and said material corresponds to the formula $M_2O_3$.

10. A film electrode as claimed in claim 1 wherein said film layer comprises photoactive true solid/solid solution semiconductor mixed metal oxide material of said formula where r is 0, y is 1, z is 1 and said material corresponds to the formula MO.

11. A film electrode as claimed in claim 1 wherein A of said formula of said film layer is a single metal.

12. A film electrode as claimed in claim 1 wherein A of said formula of said film layer is a single metal selected from the group consisting of strontium, zinc and the lanthanides.

13. A film electrode as claimed in claim 1 wherein A of said formula of said film layer is a combination of from 2 to 3 different metals.

14. A film electrode as claimed in claim 1 wherein A of said formula of said film layer is a combination of from 2 to 3 different metals selected from the group consisting of strontium, zinc and the lanthanides.

15. A film electrode as claimed in claim 1 wherein M of said formula of said film layer is a combination of 2 different metals.

16. A film electrode as claimed in claim 1 wherein M of said formula of said film layer is a combination of two different metals selected from the group consisting of boron, aluminum, tin, lead, the lanthanide series and the transition metals.

17. A film electrode as claimed in claim 1 wherein M of said formula of said film layer is a combination of titanium and a metal selected from the group consisting of Rh,Ru,Ir,Mn,Cr,Fe,V and Pt.

18. A film electrode as claimed in claim 1 wherein M of said formula of said film layer is a combination of aluminum and a metal selected from the group consisting of Rh,Ru,Ir,Mn,Cr,Fe,V and Pt.

19. A film electrode as claimed in claim 1 wherein M of said formula of said film layer is a combination of Ru or Rh and one metal selected from the group consisting of niobium, lanthanum, tantalum, tin and zirconium.

20. A film electrode as claimed in claim 1 wherein M of said formula of said film layer is a combination of 3 to 4 different metals characterized in that one metal is selected from the group Al,Nb,La,Ta,Sn,Ti and zr and the remaining different metals are selected from the group consisting of Ir,Mn,Cr,Fe,V,Pt,Rh and Ru.

21. A film electrode as claimed in claim 1 wherein said substrate is titanium.

22. A film electrode as claimed in claim 1 wherein said substrate is zirconium.

23. A film electrode as claimed in claim 1 wherein said substrate is tin.

24. A film electrode as claimed in claim 1 wherein said film layer is produced using a single layer of said photoactive true solid/solid solution semiconductor mixed metal oxide material.

25. A film electrode as claimed in claim 1 wherein said film layer is produced using at least two layers of said photoactive true solid/solid solution semiconductor mixed metal oxide material.

* * * * *